May 2, 1939.  F. A. GARBUTT  2,156,810
METHOD OF FORMING STICKS OR RIBBONS OF CHEWING GUM OR THE LIKE
Filed Dec. 28, 1936  4 Sheets-Sheet 1

INVENTOR
FRANK A. GARBUTT
BY
*Fred W Harris*
ATTORNEY.

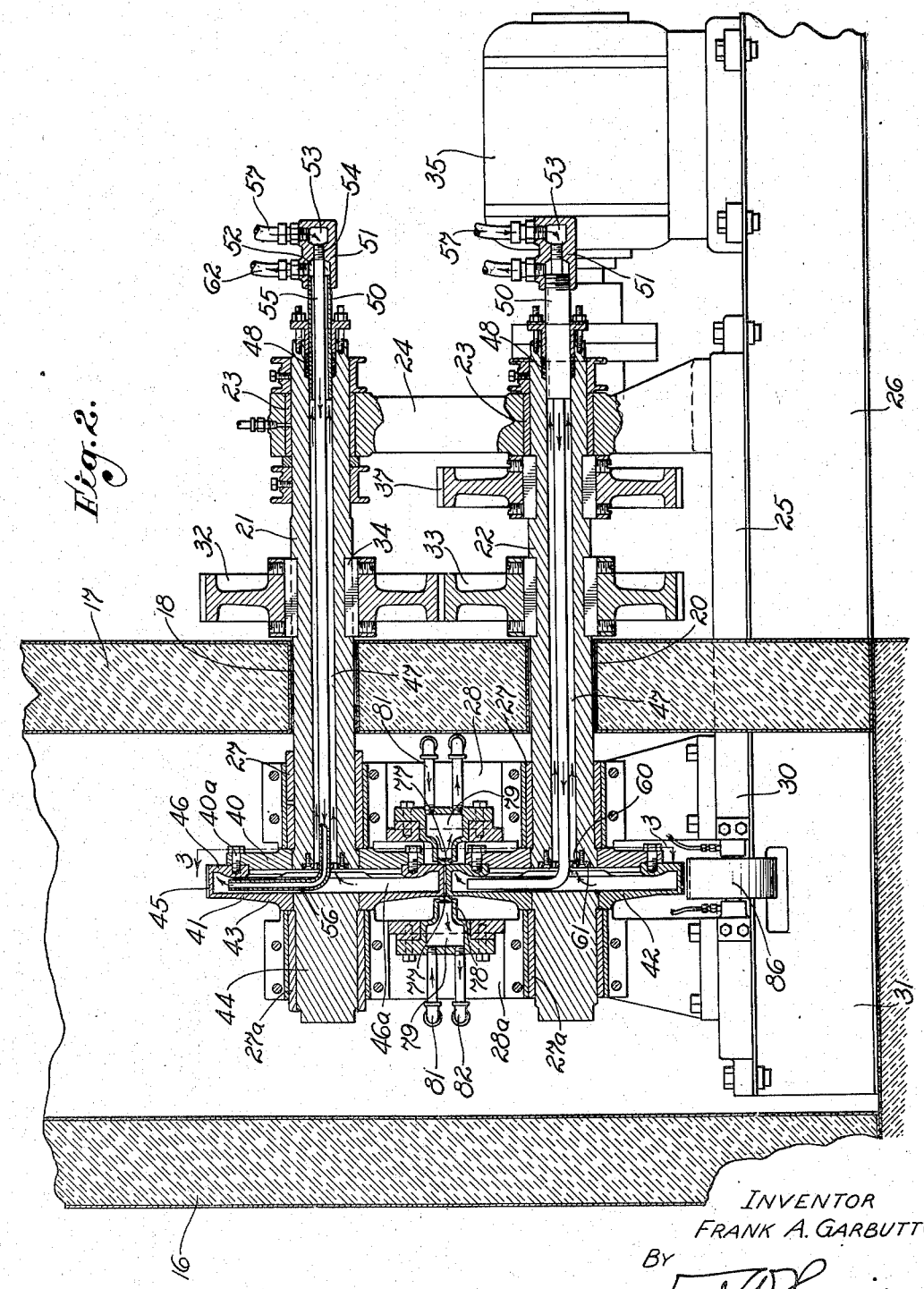

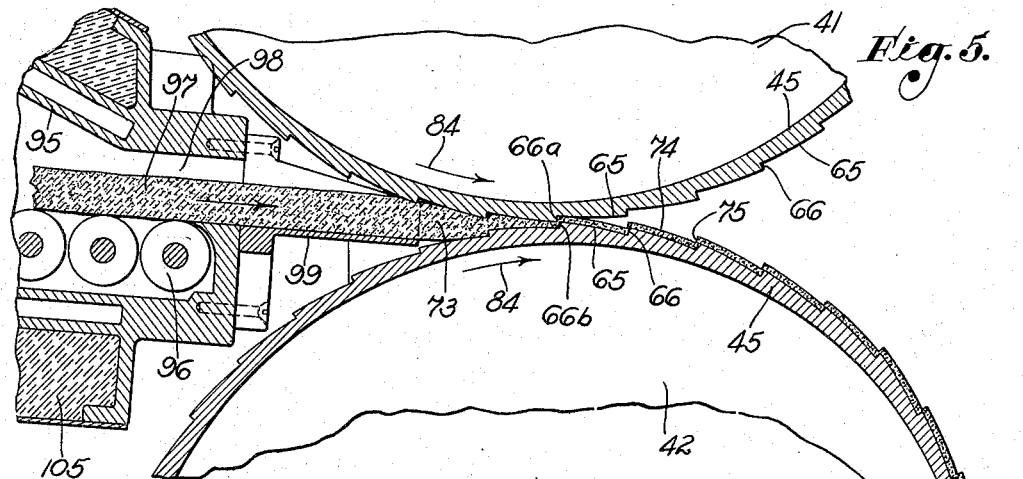
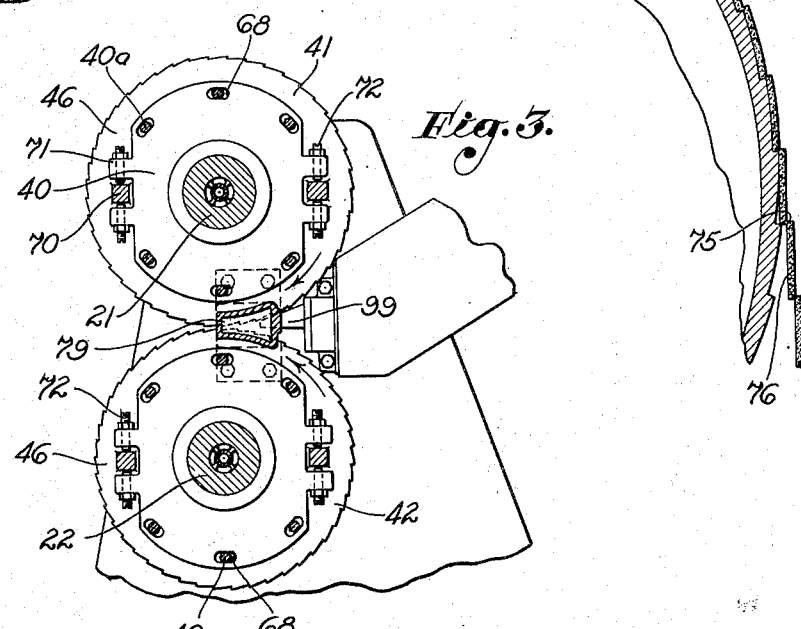
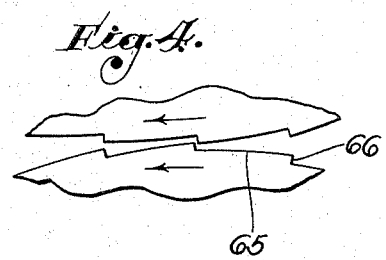
INVENTOR
FRANK A. GARBUTT
BY
ATTORNEY.

May 2, 1939.　　　　　F. A. GARBUTT　　　　　2,156,810
METHOD OF FORMING STICKS OR RIBBONS OF CHEWING GUM OR THE LIKE
Filed Dec. 28, 1936　　　　4 Sheets-Sheet 4

INVENTOR
FRANK A. GARBUTT
BY
Fred W Lamir
ATTORNEY.

Patented May 2, 1939

2,156,810

UNITED STATES PATENT OFFICE 2,156,810

METHOD OF FORMING STICKS OR RIBBONS OF CHEWING GUM OR THE LIKE

Frank A. Garbutt, Los Angeles, Calif.

Application December 28, 1936, Serial No. 117,932

11 Claims. (Cl. 107—54)

My invention relates to a method of especial utility in molding gum, especially gum of the chicle type, into desired shapes such, for instance, as sticks of chewing gum. Although the invention is capable of a relatively broad utility, its present principal use is for the manufacture of sticks of chewing gum, and accordingly it is believed that the invention may be best disclosed in conjunction with this selected use. The practice of making chewing gum is at present to roll the prepared gum into sheets of desired thickness and then to cut such sheets to stick form.

It is an object of my invention to provide a method of forming sticks of chewing gum in a cheaper and accordingly more efficient manner than is possible by use of accepted practices.

It it an object of my invention to provide a method wherein the gum, heated to plastic condition, is quickly formed into a continuous strip consisting of consecutive sticks or wafers joined together by a thin web or wall of the gum so that such strip may be readily broken up into gum sticks of uniform size.

It is an object of my invention to provide a method in which chewing gum of the chicle type can be formed into sticks between metal surfaces under conditions that insure the formation of perfect sticks without causing the gum to adhere to these surfaces.

The term "gum of the chicle type" is used to denote the ordinary chewing gum of commerce which is compounded from chicle or chicle substitutes and various other substances. Such gum is plastic at mouth temperatures and higher temperatures, but when in a highly plastic condition is highly adhesive, sticking to all sorts of surfaces against which it is pressed.

In the methods now used in the manufacture of chewing gum, the gum from the mixer is cooled to room temperature, and portions thereof are then rolled into sheets between rolls under light pressures, powdered sugar being employed to reduce the liability of sticking. I have discovered that chewing gum can be formed directly into any desired shape without using sugar or other dusting agent, if the gum is quite plastic and the forming surfaces are quite cold. In practice I prefer to feed the gum to the forming means at a temperature somewhat above 100° F. and to maintain the forming means at a temperature well below 32° F. and preferably considerably colder. I also perform the forming operation with sufficient rapidity to prevent the gum from hardening due to its being cooled by the cold forming means during the forming operation to a sufficient degree for the plasticity of the gum to be reduced to a sufficient degree to necessitate high pressures being exerted thereon.

If the forming means are maintained at low temperatures in contact with the atmosphere, moisture will condense on the surfaces thereof and the fine particles of water so condensed will freeze forming "frost" which is undesirable. It is a further object of my invention to prevent this frost formation by surrounding the forming means with dry air.

Further objects and advantages of the invention will be made evident throughout the following part of the specification.

A further object is to provide a simple means for applying liquid to the gum forming means so that said means may be operated under adverse humidity conditions.

This application is a continuation-in-part of my application Serial No. 723,111 for "Method and apparatus for forming gum sticks", filed April 30, 1934.

Referring to the drawings, which are for illustrative purposes only:

Fig. 2 is a cross-section on a plane represented by the line 2—2 of Fig. 1.

Fig. 3 is an enlarged section taken as indicated by the line 3—3 of Fig. 2, showing the means for adjusting the forming rolls.

Fig. 4 is a fragmentary view showing the engaging portions of the rolls and the manner of their adjustment.

Fig. 5 is an enlarged fragmentary sectional view illustrating the manner in which the plastic material is formed into bodies of desired shape.

Figure 1:
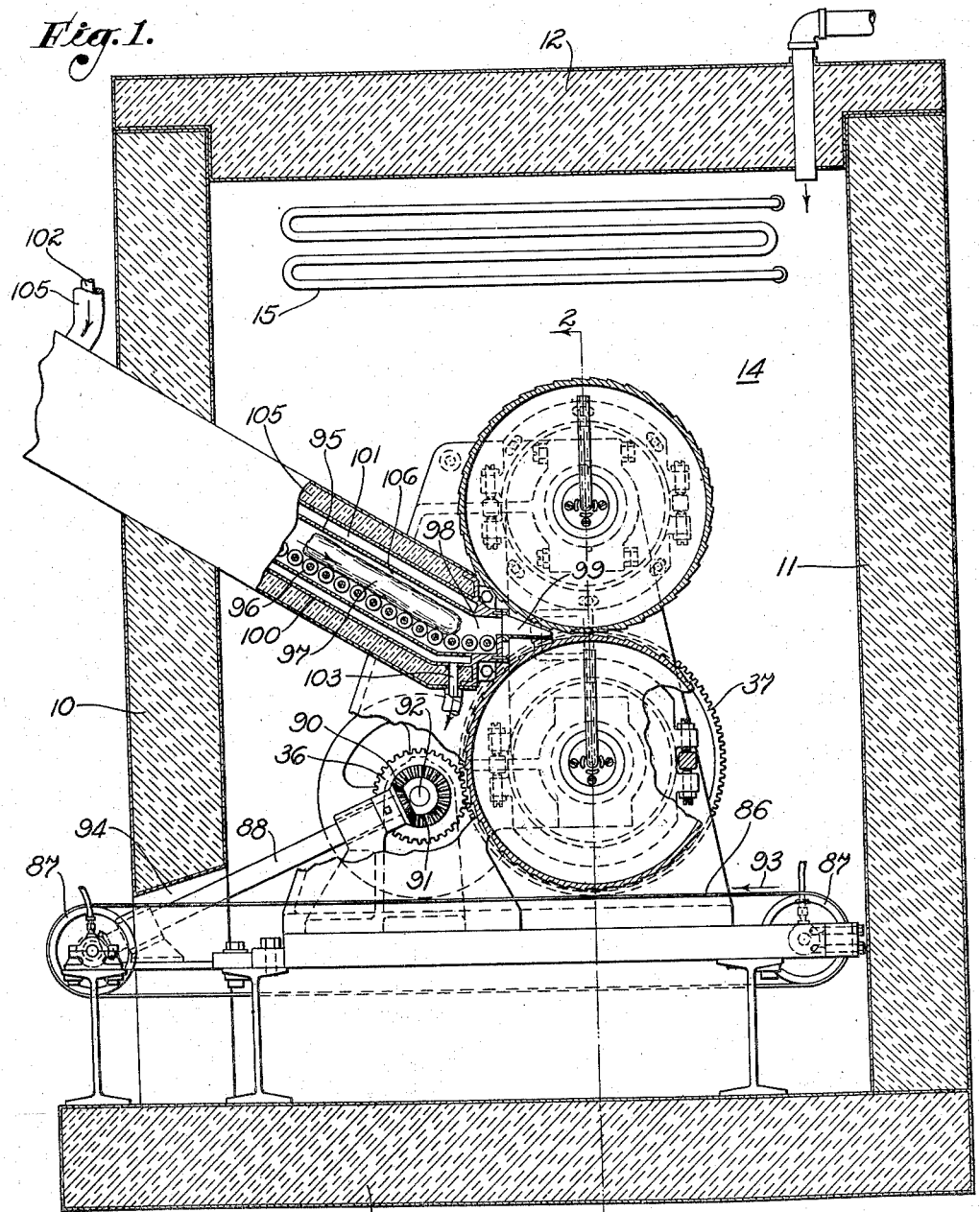
Fig. 1 is an end view of a preferred form of my invention.

In the form of the invention shown in the drawings I prefer to employ insulated walls 10, 11, 12, and 13 forming a chamber 14 adapted to be refrigerated by use of cooling coils 15. The cooling coils 15 are maintained at a temperature considerably below that of the forming means so that any moisture in the air collects and freezes thereon, thus drying the air to a point at which no moisture will condense on the forming means. The coils 15 are, of course, merely a convenient means for insuring a supply of dry air around the forming means and any other means may be used for this purpose. The coils 15 may be placed outside the chamber 14 in a separate chamber in open communication with the chamber 14, or the air may be dried by any other convenient means.

The chamber 14 has, as shown in Fig. 2, front and rear end walls 16 and 17, and the wall 17 is provided with openings 18 and 20 through which upper and lower hollow shafts 21 and 22 project. The outer ends of the shafts 21 and 22 are carried in bearings 23 which are supported by an outer bracket 24 supported on a base plate 25 which may be carried on sleepers 26 formed of I-beams. The inner ends of the shafts 21 and 22 are carried in bearings 27 supported in a bracket 28 carried by a base plate 30 which may be supported on I-beams 31. The shafts are linked together so as to rotate at the same rate of speed, but in opposite directions, by spur gears 32 and 33 which are secured respectively upon the shafts 21 and 22 by means of keys 34, and both shafts may be driven by use of an electric motor 35 so connected as to drive through a pinion 36, Fig. 1, a spur gear 37 mounted upon the shaft 22. The leftward or inner end of each shaft 21 and 22, Fig. 2, carries a flange or plate 40 thereon, and to these plates 40 upper and lower forming members 41 and 42 are secured by means of cap screws 40a. The forming members 41 and 42 each include a circular wall 43 mounted upon a stub shaft 44, a peripheral wall 45 extending rightwardly from the edge of the wall 43, and an annular wall 46 extending radially inwardly from the rightward end of the peripheral wall 45 to receive the cap screws 40a. The stub shafts 44 are mounted in bearings 27a carried by a bracket 28a which is also mounted upon the base plate 30.

By use of the structure above described, the forming members 41 and 42 are each provided with an interior chamber 46a with which communication is made through the bores 47 of the hollow shafts 21 and 22. The outer end of each shaft 21 and 22 is provided with a gland or equivalent packing device 48 into which a tube 50 extends, there being a stationary fitting 51 secured to the outer end of each tube 50. Each fitting 51 is provided with a forward chamber 52 communicating with the outer end of the tube 50 associated therewith, and an outer chamber 53 having an axial threaded opening 54 into which a delivery pipe 55 may be screwed. Each delivery pipe 55 extends through the bore 47 of a hollow shaft 21 or 22 and has the discharge end 56 thereof bent upwardly within the chamber 46a of a forming member 41 or 42. Through conduits 57 a suitable refrigerant is delivered into the chambers 53 of the fittings 51 and is conducted from the chambers 53 through the pipes 55 into the upper portions of the spaces 46a within the forming members 41 and 42. The refrigerant is discharged from the spaces 46a through openings 60 in plates 61 provided at the inner ends of the hollow shafts 21 and 22 for supporting the inner or leftward ends of the pipes 55. The discharged refrigerant passes rightwardly through the bores 47 around the pipes 55, and through the tubes 50 to the chambers 52 of the fittings 51, and is returned therefrom to the refrigerating apparatus through conduits 62 which lead outwardly from the chambers 52.

As best shown in Fig. 5, the external faces of the peripheral walls 45 of the forming members 41 and 42 are provided with relatively short helical faces 65 separated by radial walls 66, giving the forming members a ratchet tooth form. In the form of the invention shown, the walls 66 are shown faced in anti-clockwise direction so that the walls 66 at the lower portion of the upper forming member 41 will face rightwardly in opposition to the walls 66 which are faced leftwardly at the upper portion of the lower forming member 42.

As shown best in Fig. 3, the cap screws 40a extend through circularly elongated openings 68 in the flange plates 40 so that the walls 46 of the forming members 41 and 42 may have limited rotation relative to the plates 40, and means for rotative adjustment of the forming members are provided in the form of lugs 70 which extend outwardly from the walls 46 of the forming members 41 and 42 into spaces between approximately radial lugs 71 on the flat plates 40. Adjustment screws 72 project in tangential direction through the lugs 71 into engagement with opposite sides of the lugs 70. By use of these screws 72 the lugs 70 may be moved back and forth through limited distances and thereby rotate the forming members 41 and 42 so as to change the alignment of the walls 66 of the respective forming members 41 and 42. The forming members are so spaced apart that a plastic material 73 fed therebetween will be shaped or formed into thin wafers between the cooperating helical walls 65 of the members 41 and 42.

Referring to Fig. 5, it will be recognized that if the forming member 41 were rotated by use of the adjustment means 70 in clockwise direction, the radial walls 66 designated specifically as 66a and 66b could be brought into engagement so that each wafer formed between cooperating helical faces 65 would be cut off or separated from the wafers adjacent thereto. I prefer, however, to so adjust the forming members 41 and 42 that a slight space will be left between cooperating radial walls 66, as clearly demonstrated by the walls 66a and 66b, in order that a thin web or wall 75 of the plastic material will connect each wafer 74 with the wafer adjacent thereto, thereby producing a continuous formed strip 76 comprising adjacent wafers joined together by thin and relatively easily ruptured connecting webs 75.

On opposite sides of the plane of cooperation of the forming members 41 and 42, side wall members 77 are disposed so as to define the edges of the wafers formed between the faces 65 of the members 41 and 42. These side wall members 77 cooperate with walls 78 in forming chamber members 79 which are supported in the brackets 28 and 28a in the positions shown in Figs. 2 and 3. These chamber members 79 have inlet and discharge pipes 81 and 82 connected thereinto for the circulation of a refrigerant to cool the wall members 77.

Figure 7:
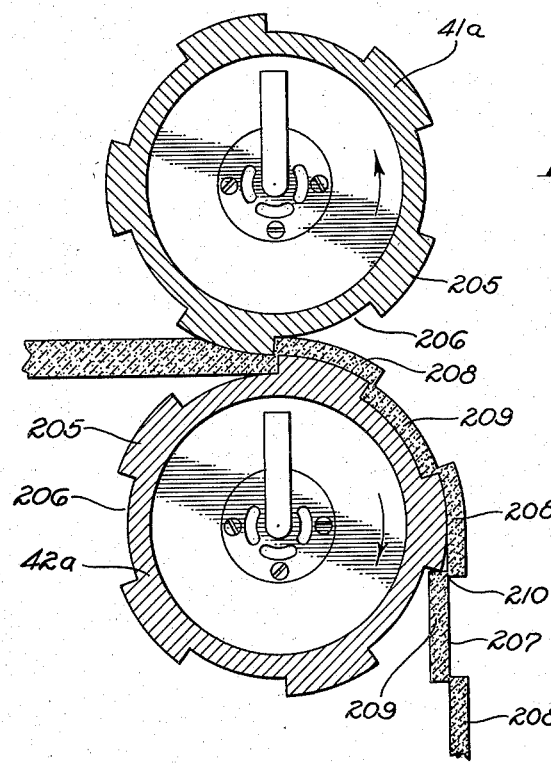
Fig. 7 is a diagrammatic representation of an alternate form of forming means.

The saw teeth of the forming members 41 and 42 are of such a shape as to readily form the gum sticks. It will be obvious to one skilled in the art that other forms of surface may be used on the forming members and still produce the desired result. For example, the forming means may have the general form shown in Fig. 7 in which 41a and 42a are the forming means which are formed with bands 205 separated by spaces 206. The gum is then formed as shown at 207 into a strip having offset sticks 208 and 209 connected by thin septums 210. Other shapes of forming means will readily occur to one skilled in the art.

A feature of the invention is that the forming means is provided with walls subjected to a refrigerant so that they will be maintained at a low temperature sufficient to prevent the gum from sticking thereto and to cause solidification of the plastic material as the result of engagement with the forming walls. The plastic material 73; that is, the warm chewing gum, may be fed into the forming means, as shown in Fig. 5, at a temperature of around 160° F. At this temperature the mixture is very pliable and easily formed so that as the rotation of the members 41 and 42 in the directions indicated by the arrows 84 draws the gum into the space between the members 41 and 42, the gum will readily flatten out to fill the space between the upper and lower faces 65 and the side wall members 77. The refrigerant maintains the walls 45 of the forming means and also the walls 77 at a temperature below freezing point, the result being that the heated and consequently plastic gum does not stick and is sufficiently cooled to such a condition that as the strip 76 is carried forwardly, the wafers 74 will maintain their respective forms. Disposed below the forming member 42 is a conveyor belt 86 carried over pulleys 87, one of which is adapted to be driven through a shaft 88 and a bevel gear 90 from a bevel gear 91 mounted on the shaft 92 which carries the drive pinion 36. The upper portion of the belt 86, moving to the left as indicated by the arrow 93, carries the strip 76 through an opening 94 in the wall 10 of the chamber 14 to a suitable disposal for the strip 76. During the movement of the strip 76 by the conveyor belt 86, it is subjected to the low temperature maintained in the chamber 14 by the refrigerating coils 15, the result being that when it issues from the opening 94 of the chamber 14 it will be in thoroughly hardened and easily handled condition.

Figure 6:
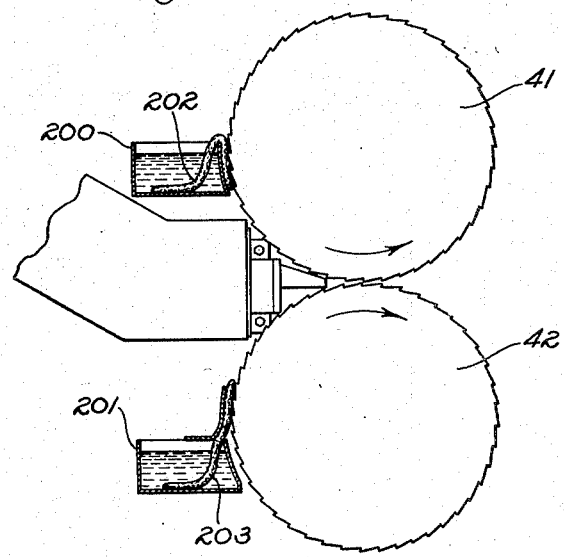
Fig. 6 is a side elevation of the forming means showing the method of applying liquid thereto.

While the apparatus above described operates perfectly if the forming means are properly cooled and proper degrees of humidity and temperature are maintained in the space surrounding the forming means, it will be found that if it is difficult to maintain these conditions the operation of the process and apparatus described will be facilitated if a liquid is applied to the surface of the forming means. This can be conveniently done by the means shown in Fig. 6 in which 41 and 42 are the forming means. Small containers 200 and 201 are placed adjacent the forming rolls and kept filled with a suitable liquid such as grain alcohol. This alcohol is delivered slowly through wicks 202 and 203 to the surface of the forming means 41 and 42 to form a thin film thereon. Alcohol will not solidify at the temperature maintained in the forming means and later readily evaporates from the surface of the formed sticks.

The invention also includes means for heating the plastic material and delivering the plastic material to the forming means at a suitable temperature. In Figs. 1 and 5 I show a passage member 95 preferably formed of metal and projecting downwardly at an angle through the insulated wall 10 of the chamber 14. This passage member 95, which is of tubular form, has rollers 96 in the lower portion thereof along which bodies 97 of the warm gum may travel toward a horizontally directed opening 98 into a feed spout 99 adapted to direct the gum into the space between the upper and lower forming members 41 and 42. Surrounding the feed or deliver member 95 is a wall forming a space or jacket 101 into which a heating fluid, such as steam, may be delivered through inlet piping 102, to be later discharged through outlet piping 103. Around the heated members of the device, for example, the walls 100 and the piping 102 and 103, a suitable wall of insulating material 105 is placed. The passage 106 within the member 95 is maintained at a constant temperature, and if the gum upon delivery into the upper end of the passage 106 is not sufficiently heated, its temperature will be raised to proper point as it moves downwardly along the rolls 96 to the forming means. In the ordinary practice of the invention, however, the gum is prepared and heated prior to its delivery into the passage 106 so that the function of the passage is then merely to maintain the gum at its desired temperature and direct the same into the forming or molding device.

It will be understood that the gum is delivered to the forming members 41 and 42 at a temperature at which it is thoroughly plastic; for example, 160° F., and at which it can be caused to flow into its final shape and be formed into sticks by the application of very little pressure. The members 41 and 42 are quite cold; in fact, they may be at a temperature of minus 20° F. Due to this low temperature and the low pressure required to form the warm gum the gum is formed into sticks or wafers without adhering to the members 41 and 42. The outer surface of the gum is cooled by the cold surfaces of the rolls 41 and 42 so that the wafers 76 will hold their shape until they are cooled by the air surrounding the apparatus. At the low temperature at which it issues from the machine disclosed, the gum may be readily broken up along the lines of division into separate sticks, this being done before the temperature of the gum has risen to room temperature.

I claim as my invention:

1. A method of producing a ribbon of chewing gum which comprises: heating said gum to a plastic condition; forcing a portion of the plastic mass so produced between forming means to give it the desired shape; and maintaining the temperature of the surface of said forming means at a sufficiently low temperature to prevent the gum from adhering to said forming means without the application of sugar or other powdered material to the surface of the mass or to the forming means.

2. A method of producing a ribbon of chewing gum which comprises: heating said gum to a plastic condition; forcing a portion of the plastic mass so produced between forming means to give it the desired shape; applying a thin film of a suitable liquid to the surfaces of said forming means; and maintaining the temperature of the surface of said forming means at a sufficiently low temperature to prevent the gum from adhering to said forming means.

3. A method of forming chewing gum and the like by a molding means, said method comprising: cooling the molding means substantially below room temperature; heating the gum to be molded to a plastic state; and applying the cooled molding means to the plastic gum without the application of sugar or other powdered material to the gum or to the molding means.

4. A method of forming chewing gum and the like by a molding means, said method comprising: cooling the molding means substantially below room temperature; heating the gum to be molded to a plastic state; applying to the surface of the molding means a film of a liquid having a freezing point substantially below the temperature of the molding means; and then applying the molding means to the plastic gum.

5. A method of employing a molding means to form chewing gum and the like, said method comprising: cooling the molding means substantially below room temperature; dehydrating the atmosphere in the vicinity of the molding means to prevent condensation of moisture thereon; heating the gum to be molded to a plastic state; and applying the cooled molding means to the plastic gum without the application of sugar or other powdered material to the gum or to the molding means.

6. A method as described in claim 5 in which the molding means is refrigerated to a temperature below 32° F.

7. A method of employing a molding means to form chewing gum and the like, said method comprising: cooling the molding means substantially below room temperature; dehydrating the atmosphere in the vicinity of the molding means to prevent condensation of moisture thereon; heating the gum to be molded to a plastic state; applying to the surface of the molding means a film of a liquid having a freezing point substantially below the temperature of the molding means; and applying the cooled molding means to the plastic gum.

8. A method of producing chewing gum sticks characterized by the steps of: forming a plastic mass of gum into a continuous series of successively offset sticks interconnected by lateral septums; cooling the interconnected sticks to hardness; and then breaking the septums.

9. A method of producing chewing gum sticks that is characterized by the steps of: forming a plastic mass of gum into a continuous series of sticks interconnected at overlapping margins; cooling the interconnected sticks to hardness; and then breaking the sticks apart.

10. A method of forming chewing gum or the like by a molding means, said method comprising: delivering the gum to the molding means at a temperature sufficiently high to make the gum plastic; and maintaining the molding means at a temperature sufficiently below that of the gum so delivered to permit the gum to be formed into sticks without adding sugar or other powdered material to the surface of the gum or to the surface of the molding means.

11. A method of forming chewing gum or the like by a molding means, said method comprising: delivering the gum to the molding means at a temperature sufficiently high to make the gum plastic; maintaining the molding means at a temperature sufficiently below that of the gum so delivered to permit the gum to be formed into sticks without adding sugar or other powdered material to the surface of the gum or to the surface of the molding means; and maintaining the humidity of the atmosphere surrounding the molding means at a sufficiently low value to prevent moisture from condensing on said molding means.

FRANK A. GARBUTT.